United States Patent
Serres

(10) Patent No.: US 6,197,153 B1
(45) Date of Patent: Mar. 6, 2001

(54) METHOD FOR DE-INKING PAPER PULP FROM RECYCLED PAPER

(75) Inventor: Alain Serres, Reims (FR)

(73) Assignee: E & M Lamort, Vitry (FR)

( * ) Notice: Subject to any disclaimer, the term of this patent is extended or adjusted under 35 U.S.C. 154(b) by 0 days.

(21) Appl. No.: 09/210,733

(22) Filed: Dec. 15, 1998

(30) Foreign Application Priority Data

Dec. 15, 1997 (FR) .................................................. 97 15839

(51) Int. Cl.$^7$ ....................................................... D21B 1/08
(52) U.S. Cl. .............................. 162/4; 209/164; 209/170; 210/195.1; 210/221.2
(58) Field of Search ........................ 162/4, 5, 6; 209/170, 209/164; 210/188, 195.1, 197, 221.2, 538

(56) References Cited

U.S. PATENT DOCUMENTS

| 3,865,719 | 2/1975 | Holik et al. ............................ 209/170 |
| 4,094,783 | 6/1978 | Jackson .................................. 210/63 |
| 4,186,094 | 1/1980 | Hellberg ............................... 210/221 |
| 4,288,319 | 9/1981 | Heijs et al. ............................ 209/166 |
| 4,331,534 | 5/1982 | Barnscheidt .......................... 209/164 |
| 4,347,128 | 8/1982 | Barnscheidt .......................... 209/170 |
| 4,399,028 | 8/1983 | Kile et al. ............................. 209/164 |
| 4,721,562 | 1/1988 | Barnscheidt et al. ................ 209/170 |
| 4,722,784 | 2/1988 | Barnscheidt .......................... 209/164 |
| 4,952,308 | 8/1990 | Chamberlin et al. ................ 209/170 |
| 5,028,315 | 7/1991 | Cruea et al. .......................... 209/164 |
| 5,234,112 | * 8/1993 | Valenzuela et al. .................. 209/169 |
| 5,242,585 | 9/1993 | Krofta .................................. 210/188 |
| 5,454,935 | 10/1995 | Magaraggia .......................... 209/169 |
| 5,650,044 | * 7/1997 | Serres ...................................... 162/4 |

FOREIGN PATENT DOCUMENTS

| 35 24 071 | 1/1987 | (DE) . |
| 42 04 915 | 8/1993 | (DE) . |
| 0 122 747 | 10/1984 | (EP) . |
| 0 198 737 | 10/1986 | (EP) . |
| 0 305 251 | 3/1989 | (EP) . |
| 0 798 416 | 10/1997 | (EP) . |
| 2 347 984 | 11/1977 | (FR) . |
| 2 717 192 | 9/1995 | (FR) . |
| WO 80/00423 | 3/1980 | (WO) . |
| WO 93/04784 | 8/1993 | (WO) . |

* cited by examiner

Primary Examiner—Dean T. Nguyen
(74) Attorney, Agent, or Firm—Nixon & Vanderhye P.C.

(57) ABSTRACT

The method for de-inking paper pulp produced by the reduction to pulp, with water, of old papers of various qualities according to which a stream of air bubbles (C) is sent through the flow ($E_2$, $S_2$, $E_3$, $S_3$) of pulp at least once, is characterized by the fact that a countercurrent of water ($E_1$) is sent into the stream of de-inking air bubbles after said bubbles have passed through the pulp and become laden with ink particles so that the countercurrent releases the particles (fibers, fines, fillers) borne along by these de-inking bubbles and carries them away.

4 Claims, 3 Drawing Sheets

METHOD FOR DE-INKING PAPER PULP FROM RECYCLED PAPER

BACKGROUND AND SUMMARY OF THE INVENTION

The object of the invention is to provide a method for de-inking paper pulp from old papers.

The used paper recycling process starts with the separation, by stirring in water, of the bales of old papers in order to obtain a pulp. This pulp is then screened in order to remove foreign bodies, known as contaminating substances, such as staples, paper clips, and plastic elements.

This pulp thus rid of coarse foreign bodies then comprises three types of components:
- fibers: i.e. the non-mineral part retained on a 100-mesh sieve;
- fines: i.e. the complement of fibers in the non-mineral part;
- fillers: i.e. the mineral part remaining after the pulp has been put through an oven at 470°.

The fillers come, on the one hand, from the usually white-colored, relatively large mineral particles added to paper during production thereof to endow it with opacity and whiteness, and, on the other hand, from the coating of coated paper. In addition to mineral particles, the coating contains binders which are products similar to glue, and numerous other components only present in a very small proportion. Of the fillers used, mention might be made of e.g. carbonate (chalk); by binders is meant products similar to glues.

In order to develop certain physical features of the paper produced, the fibers have to be refined. This operation also generates fine elements which are fiber fragments and which are not retained by the 100-mesh grid.

The fines are therefore comprised of fragments of fiber, of the non-mineral fraction of the coating of coated paper, of the organic part of ink and, finally, of the organic part of the small contaminating substances that pass through the 100-mesh sieve.

Of course, bales of recycled old papers contain all possible kinds of paper, ranging from cardboard to onion skin paper, these papers being coated or otherwise, and comprising all sorts of contaminating substances.

Printing inks must be added to the foresaid.

The next stage in the processing is de-inking which is usually performed by injecting air into the pulp in order to create air bubbles to the walls to which ink particles become attached. This aeration operation causes the appearance, on the surface of the mass of pulp, of a foam comprised of bubbles which walls retain particles of ink, and this foam is then evacuated.

French Patent Application No. 94-02886 dated Mar. 11, 1993 describes a method of de-inking by means of air bubbles, consisting in creating, in an enclosures, by successive recycling phases of the pulp, stage by stage, from the top towards the bottom of the enclosure, a downward movement of the pump mass by stages, this movement being crossed by an upward movement of bubbles so that each level stage (or each level of recycling), the pulp current is passed through by a stream of bubbles practically perpendicular to the pulp current.

In reference to FIG. 1, it can be seen that the device is comprised of an enclosure 1, arranged vertically and comprising, from the top downwards, four inlet openings E bearing the references $E_1$, $E_2$, $E_3$, $E_4$ and four outlet opening referenced $S_1$, $S_2$, $S_3$, and $S_4$, these opening being located at the base of four deflectors $D_1$, $D_2$, $D_3$ and $D_4$ composed of a vertical part and a slanted part.

The inlet opening $E_1$, which is at the highest level, is the one through which the pulp to be de-inked will arrive.

To each inlet opening such as e.g. $E_1$ corresponds an outlet opening $S_1$ so that the major part of the (or even the entire) flux entering the enclosure at $E_1$ will exit at $S_1$. The outlet $S_1$ is connected to the inlet $E_2$, which is situated below the level of the inlet $E_1$ so that the product thus recycled will be recycled at a lower level.

In the example represented, the outlets $S_1$, $S_2$, $S_3$, and $S_4$ are situated at a level below that of the inlets $E_1$, $E_2$, $E_3$, $E_4$ to which they correspond, though this is not obligatory.

In this example, the second inlet $E_2$ is located slightly below the first outlet $S_1$; the third inlet $E_3$ is located slightly below the second outlet $S_2$; the fourth inlet $E_4$ is located slightly below the third outlet $S_3$; the fourth outlet $S_4$ is situated in the bottom part of the enclosure 1.

The outlet $S_4$ is the one via which the pulp, rid of its ink, is evacuated.

In its upper part, the enclosure 1 comprises one or more openings M for foam evacuation purposes.

The outlet $S_1$ is connected to the inlet $E_2$ by means of a pipe 2 upon which a pump $P_1$ is arranged. Similarly, the outlet $S_2$ is connected to the inlet $E_3$ with a pump $P_2$ placed in between, and openings $S_3$ and $E_4$ are connected via a pump $P_3$.

The pulp is fed(by any appropriate means), via $E_1$ into the enclosure 1 which is filled up to the level N situated above the inlet $E_1$ and below the foam evacuation pipe M.

Once this level has been reached, the recycling pumps $P_1$, $P_2$ and $P_3$ are activated.

The pulp arriving via $E_1$ is entirely or partly evacuated via the outlet $S_1$, and the pipe 2 enables the pulp to be reintroduced into the enclosure via the inlet $E_2$.

The pulp reintroduced via $E_2$ is entirely or partly evacuated via the outlet $S_2$ and then reintroduced via $E_3$; after $E_3$, it exits via $S_3$ before being reintroduced via $E_4$; from $E_4$ it then moves towards outlet $S_4$ from which is evacuated by the pipe 7.

Preferably, the pump $P_3$, which is the pump by which the pulp is recycled to the lowest part of the enclosure, is associated with an air injector $I_3$ supplied by an air duct 6. As a result, the flow of pulp arriving at $E_4$, which is the lowest inlet openings of the enclosure, is full of air bubbles. These air bubbles will rise so that the pulp recycled at $S_3$, $S_2$ and $S_1$ is again mixed with the bubbles and therefore that the bubbles which finish by arriving at the level M have been mixed into the pulp, and been stirred around in the pulp several time over and so that the probability of collision between the bubbles and the ink particles will have been increased.

Additional air injectors $I_2$ and $I_1$ can be arranged in association with the pumps $P_2$ and $P_1$, thereby increasing the quantity of bubbles rising up through the descending mass of pulp.

In the example represented, there are three recycling circuits $S_1$-$E_2$, $S_2$-$E_3$, $S_3$-$E_4$; however, the invention is obviously not limited to this particular case.

This method enables a very pure and almost completely de-inked pulp to be obtained.

However, it has been observed that the foam contains a lot of fillers, fines and fibers of small dimensions, either because these particles were mechanically conveyed by the bubbles or because they were bonded by the ink to the bubbles.

DETAILED DESCRIPTION OF THE PREFERRED EMBODIMENTS

According to the invention, this drawback is partially remedied by washing the bubbles in a countercurrent of water.

The invention therefore relates to a method for de-inking paper pulp produced by the reduction to pulp, with water, of old papers of various qualities according to which a stream of air bubbles is sent through the flow ($E_2$, $S_2$, $E_3$, $S_3$) of pulp at least once, characterized by the fact that a countercurrent of water ($E_1$) is sent into the stream of de-inking air bubbles after said bubbles have passed through the pulp and become laden with ink particles so that the countercurrent of water releases the particles (fibers, fines, fillers) borne along by these de-inking bubbles and carries them away.

Tests conducted have revealed that it is mostly fibers, those fines coming from the refining of fibers, and only a very small amount of fillers that are recovered. Only tiny quantities of ink particles are borne along: the only fibers not recovered are the ones attached to the bubbles by ink particles still attached to these fibers.

Figure 2:
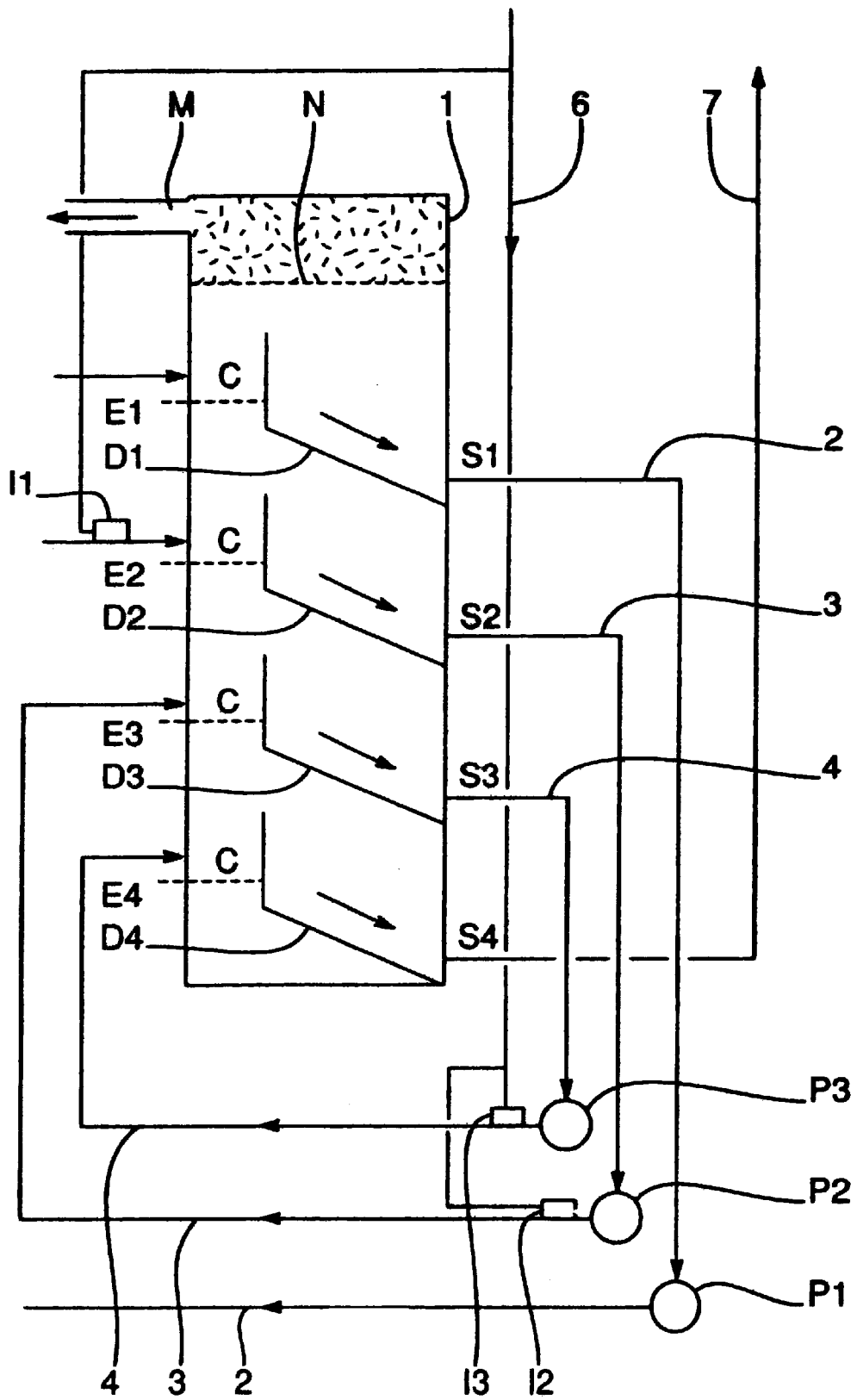
FIGS. 2–3 are schematic diagrams of a first and second embodiment of the instant invention.

As a non-limiting example, FIG. 2 is a schematic view of a device for the implementation of the method according to the invention.

Figure 1:
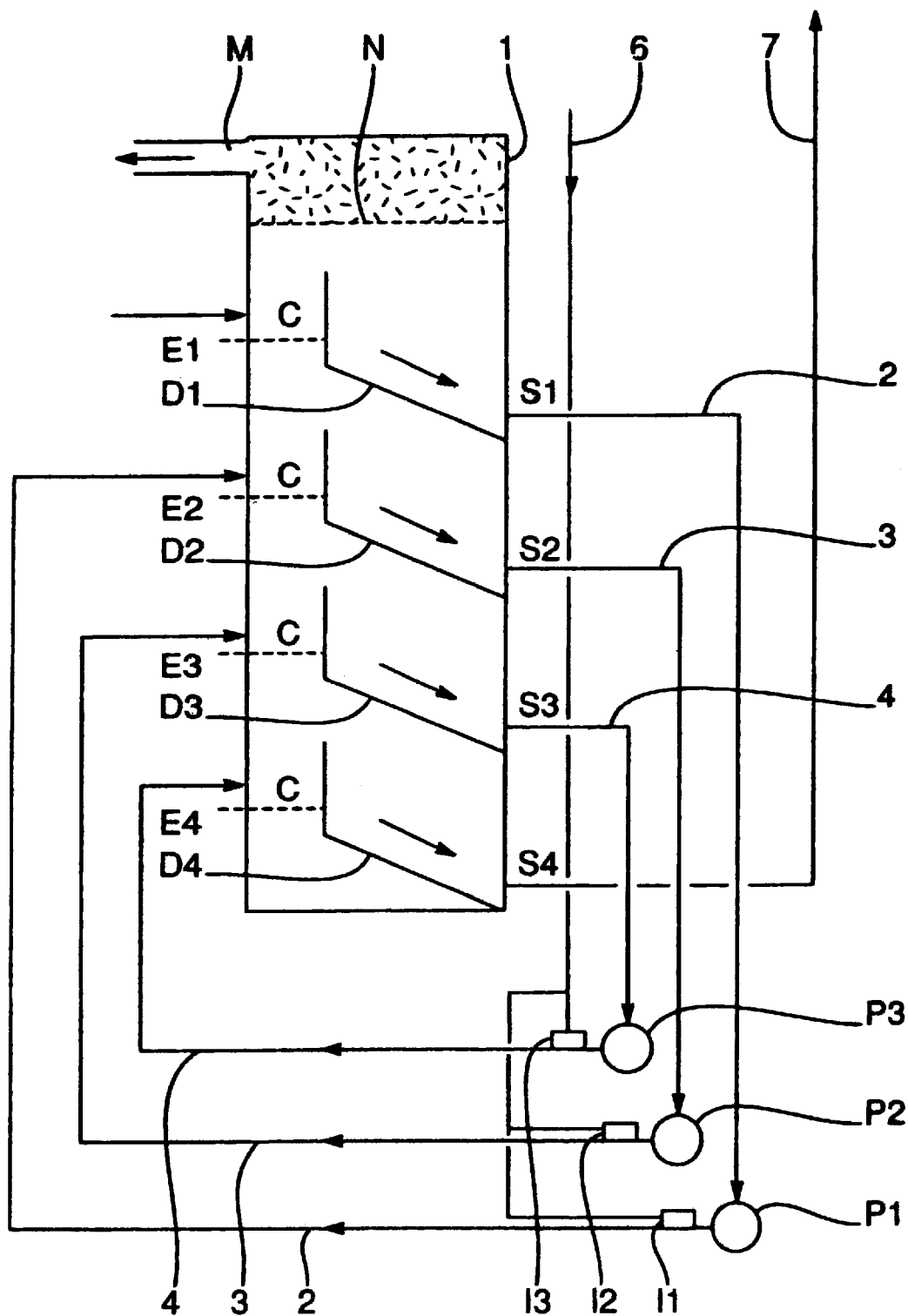
FIG. 1 is a schematic diagram of the prior art.

According to the invention (FIG. 2), and using the same cell as in FIG. 1, said cell is supplied with pulp at $E_2$ rather than at $E_1$. Water is fed in at $E_1$ instead of pulp. Part of this water is evacuated through outlet $S_1$ and part through outlet $S_2$.

The part which is evacuated through outlet $S_1$ is sent by pump $P_1$ to a reservoir containing paper pulp to be de-inked. Effectively when coming out of the various screening apparatuses which have eliminated from the paper pulp its impurities, or contaminants, the latter has a concentration in dry materials of about 2% to 3%; this percentage being too high to allow a satisfactory de-inking by means of air bubbles. It is therefore necessary to lower such concentration to 1%–1.5%. This is obtained by adding water and such water is provided by pipe 2 fed with water by pump $P_1$ with water coming from outlet $S_1$.

The other part goes down towards $S_2$ and constitutes a counter-flow going through the flow of air bubbles coming from lower levels. Such counterflow is washing said air bubbles and its detaching from them small particles (fibers, fines, fillers) which remained stuck to air bubbles and is bringing them with it.

On FIG. 2 pipe 6 is a pipe feeding air to air injectors $I_1$, $I_2$, $I_3$.

Figure 3:
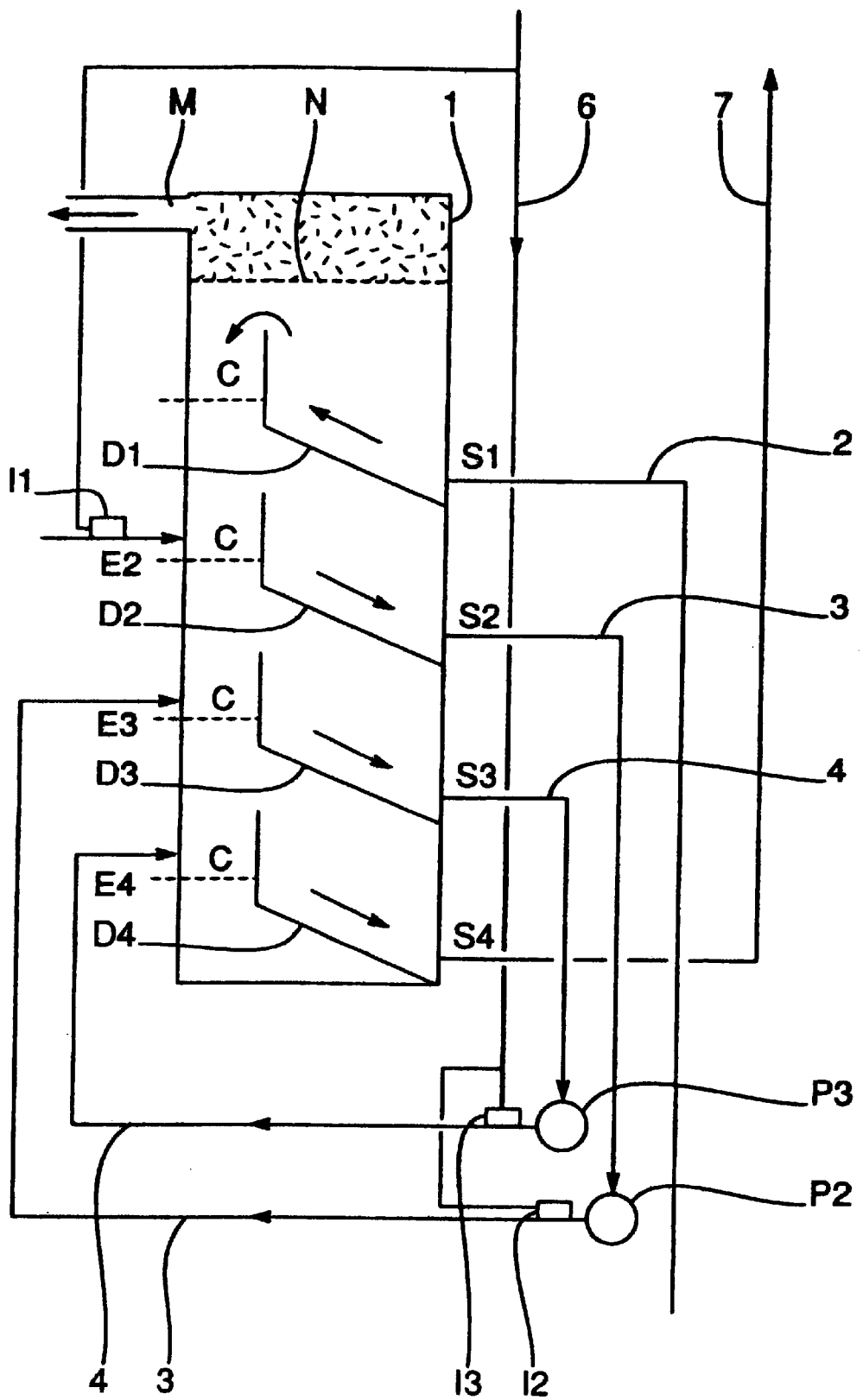

Another way of functioning is, as shown on FIG. 3, to introduce the washing bubbles water into the vessel through apertures $S_1$ (which becomes an inlet) and not to use inlet $E_1$; the whole mass of water then goes down towards $S_2$ as a counterflow.

What is claimed is:

1. Method of de-inking paper pulp produced by the reduction to pulp, with water, of papers of various qualities, said method comprising the steps of:

sending a stream of de-inking air bubbles through a flow of said pulp at least once; and sending a countercurrent of water into the stream of air bubbles after said air bubbles have passed through the pulp and become laden with ink particles, wherein the countercurrent releases at least one of fibers, fines and fillers carried by said air bubbles and carries away said at least one of said fibers, fines and fillers released thereby.

2. Method of claim 1, further including:

evacuating a first part of said water through a first outlet;

pumping the evacuated water to a reservoir containing paper pulp to be de-inked; and using a second part of said water as said countercurrent of water, wherein said second part is flowed downwardly through the flow of air bubbles towards a second outlet.

3. Method of claim 2, wherein a concentration of dry materials of the paper pulp generated from a screening device is reduced by adding additional water thereto, wherein said additional water is provided by a pipe fed by a pump with water coming from said first outlet.

4. Method of claim 1, wherein said countercurrent of water flows downwardly to an outlet.

* * * * *